(12) United States Patent
Neill et al.

(10) Patent No.: US 9,495,782 B2
(45) Date of Patent: Nov. 15, 2016

(54) INTEGRATED MEDIA BROWSE AND INSERTION

(75) Inventors: Allan W. Neill, Highland, UT (US); Scott A. Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 692 days.

(21) Appl. No.: 13/114,825

(22) Filed: May 24, 2011

(65) Prior Publication Data

US 2012/0304046 A1 Nov. 29, 2012

(51) Int. Cl.
*G06T 11/60* (2006.01)
*G06F 17/30* (2006.01)

(52) U.S. Cl.
CPC ......... *G06T 11/60* (2013.01); *G06F 17/30056* (2013.01); *G06F 17/30244* (2013.01)

(58) Field of Classification Search
CPC ............... G06F 17/30017; G06F 17/24; G06F 17/2247; G06F 17/3089; G06F 17/30011
USPC ........ 715/201, 202, 205, 206, 208, 209, 219
See application file for complete search history.

(56) References Cited

U.S. PATENT DOCUMENTS

| | | | |
|---|---|---|---|
| 7,536,642 B2* | 5/2009 | Wilbrink et al. | 715/255 |
| 2004/0233235 A1* | 11/2004 | Rubin et al. | 345/738 |
| 2009/0083615 A1* | 3/2009 | Kotler et al. | 715/219 |
| 2010/0017289 A1* | 1/2010 | Sah et al. | 705/14.49 |
| 2010/0205537 A1* | 8/2010 | Knighton et al. | 715/751 |
| 2011/0252304 A1* | 10/2011 | Lemonik | G06F 17/3089 715/234 |

OTHER PUBLICATIONS

Google; "Image Swirl"; http://www.googlelabs.com/show_details?app_key=agtnbGFiczlwL . . . ; retrieved on May 24, 2011 (two pages).
Google; "Sample Google Image Swirl search"; http://image-swirl.googlelabs.com/html?q=eiffel%20tower#1229 retrieved on May 24, 2011 (one page).

* cited by examiner

*Primary Examiner* — Amelia Tapp
*Assistant Examiner* — Seung Jung
(74) *Attorney, Agent, or Firm* — Schwegman Lundberg & Woessner, P.A.

(57) ABSTRACT

An application can receive a request to insert one file into another file opened for editing within the application. The request can be either in-line or through a menu system of the application. The request can include a context for the file to be inserted. The system can then identify a set of files that can satisfy the context, from which a user can choose what file is to be inserted. The chosen file can then be inserted into the file opened for editing, all without leaving the application.

24 Claims, 4 Drawing Sheets

Now is the time for all good men to come to the aid of their country. Now is the time for all good men to come to the aid of their country. "U.S. Capitol building" [Insert image of] Now is the time for all good men to come to the aid of their country. Now is the time for all good men to come to the aid of their country. Now is the time for all good men to come to the aid of their country. Now is the time for all good men to come to the aid of their country. Now is the time for all good men to come to the aid of their country.

...

Now is the time for all good men to come to the aid of their country. Now is the time for all good men to come to the aid of their country.

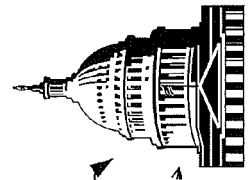

Image of "U.S. Capitol Building"

Now is the time for all good men to come to the aid of their country. Now is the time for all good men to come to the aid of their country. Now is the time for all good men to come to the aid of their country. Now is the time for all good men to come to the aid of their country. Now is the time for all good men to come to the aid of their country.

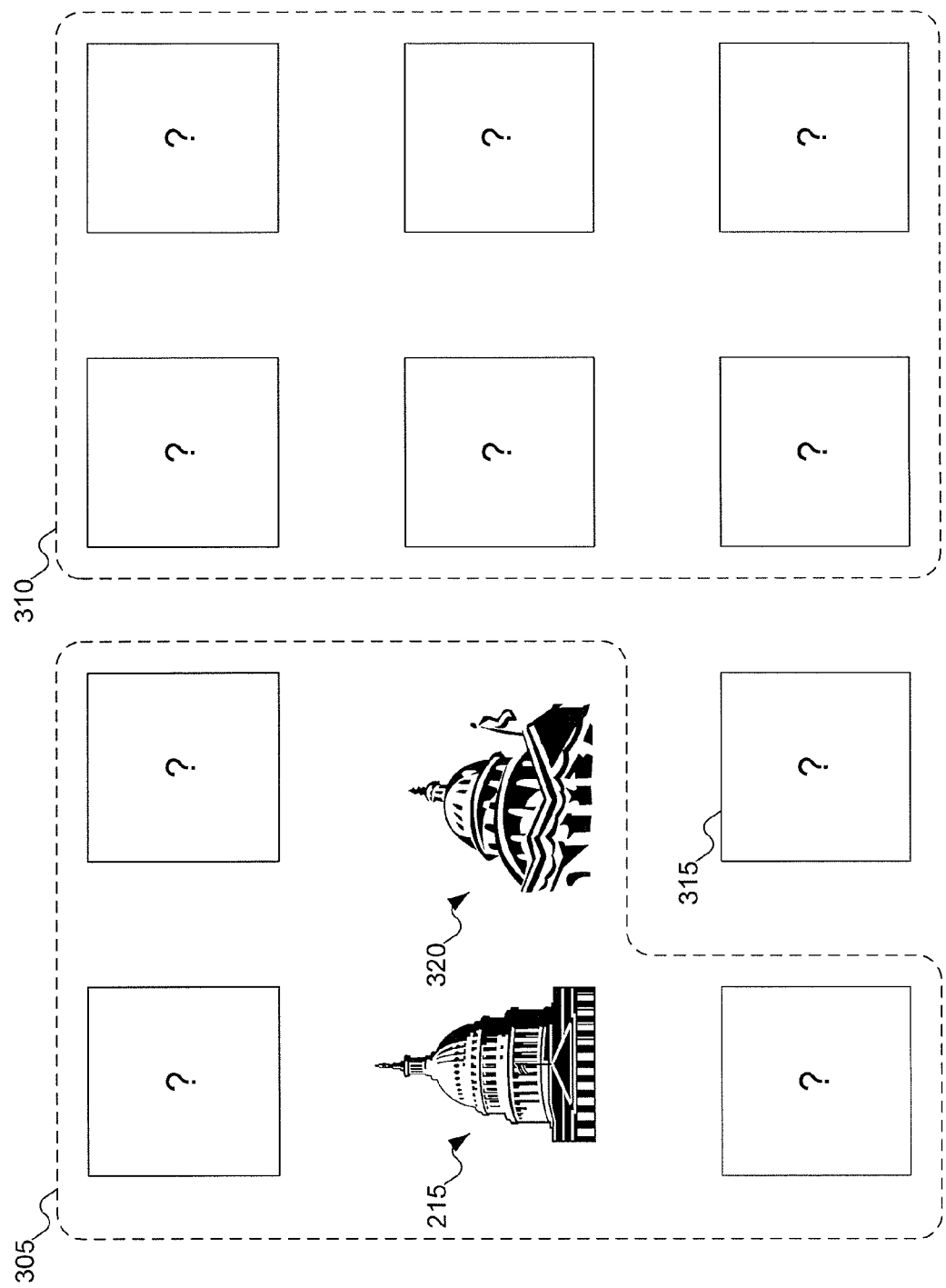

INTEGRATED MEDIA BROWSE AND INSERTION

FIELD

This invention pertains to file editing, and more particularly to integrating file browse and insertion into file editors.

BACKGROUND

Often, while editing a file, a user wants to insert content from another file. For example, a user might want to insert a picture into a text document, where the picture helps to emphasize a point in the text document. But to do such an insertion, the user must interrupt the stream of thought associated with the text of the document. The user must then locate the desired file to insert, often by switching out of the text editor into a file explorer, find the directory in which the desired file is stored, open the file, and copy the picture into the text editor.

Some applications attempt to make the process simpler, by allowing the user to activate a file explorer within the application to locate a desired picture. But the user must still interrupt his train of thought to insert the picture.

A need remains for a way to address these and other problems associated with the prior art.

SUMMARY

While editing a file, a computer can receive a request to insert another file into the edited file. The request can include a context for the desired file to be inserted. The system can then identify a set of files that satisfies the content, and the user can select one of the files to be inserted. The system can then insert the selected file into the edited file.

The foregoing and other features, objects, and advantages of the invention will become more readily apparent from the following detailed description, which proceeds with reference to the accompanying drawings.

BRIEF DESCRIPTION OF THE DRAWINGS

FIG. 2 shows a document on the machine of FIG. 1 with integrated media browse and insertion.

FIG. 3 shows sets of files from which a user can select to insert a file in the machine of FIG. 1.

DETAILED DESCRIPTION

Figure 1:
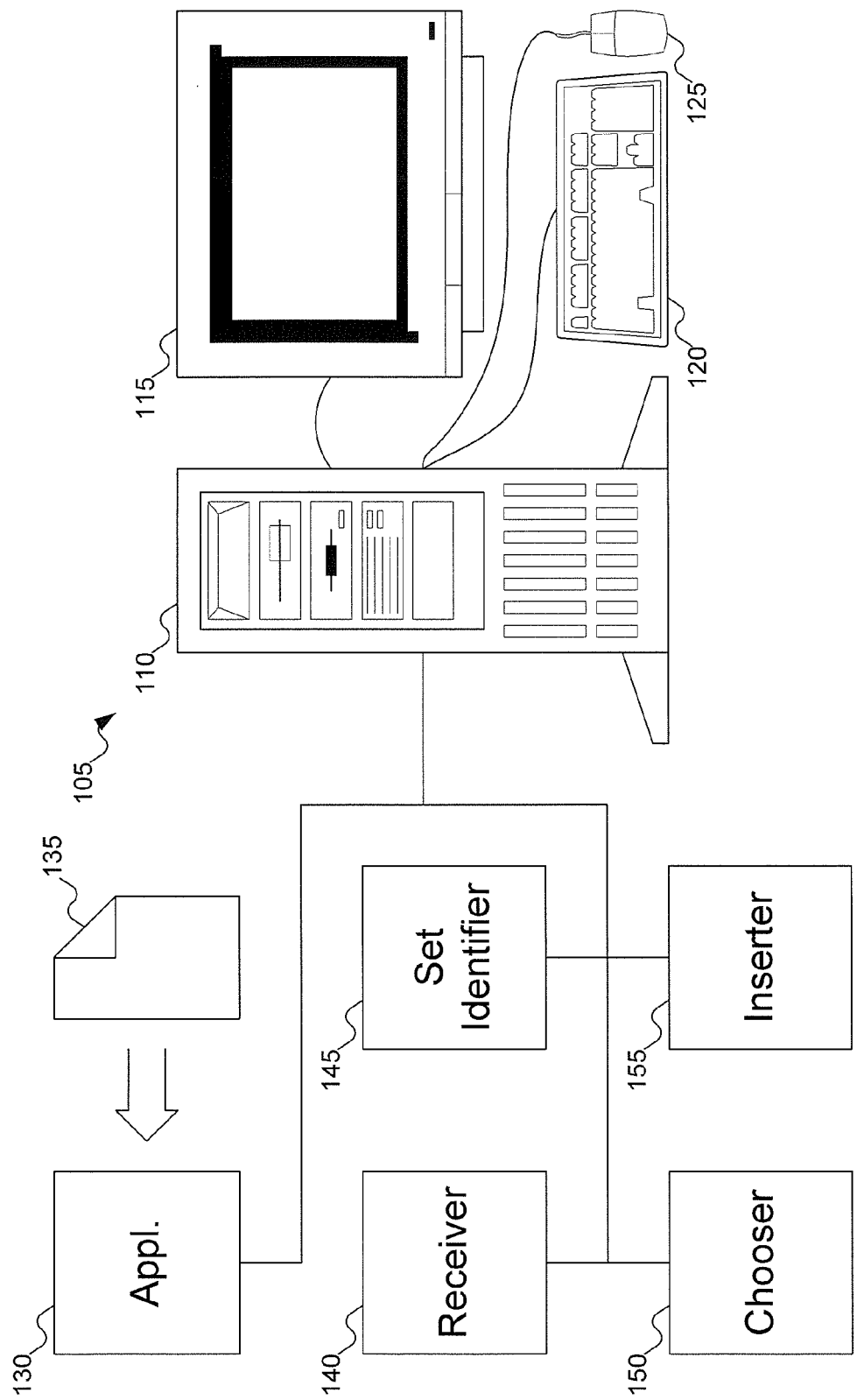
FIG. 1 shows a machine to support integrated media browse and insertion, according to an embodiment of the invention.

FIG. 1 shows a machine to support integrated media browse and insertion, according to an embodiment of the invention. In FIG. 1, machine 105 is shown. Machine 105 can be any machine capable of permitting a user to insert one file into another. Examples of forms machine 105 can take include servers, personal computers, mainframes, smart phones, and tablet computers, among other possibilities. Machine 105 can include computer 110, monitor 115, keyboard 120, and mouse 125. A person skilled in the art will recognize that other components not shown in FIG. 1 can be included with machine 105: for example, other input/output devices, such as a printer. In addition, FIG. 1 does not show some of the conventional internal components of machine 105; for example, a central processing unit, memory, storage, etc. Finally, although FIG. 1 shows machine 105 as a conventional desktop computer, a person skilled in the art will recognize that machine 105 can be any type of machine or computing device capable of providing the services attributed herein to machine 105, including, for example, a laptop computer, PDA, or a cellular telephone.

Machine 105 includes application 130. Application 130 can be any type of application that can work on a file, such as file 135. For purposes of this discussion, application 130 is assumed to be a text editing application, file 135 is assumed to be a text document, and the inserted media file is assumed to be an image file. But a person skilled in the art will recognize that focusing on text editors, text documents, and image files is simply for ease of understanding of embodiments of the invention, and that embodiments of the invention are applicable to any type of application, to any type of file that can be operated on by that application, and to any type of file that can be inserted into the file being operated on by the application.

To enable users to integrate other files, machine 105 includes receiver 140, set identifier 145, chooser 150, and inserter 155. Receiver 140 receives the user's request to integrate the other file into the edited file. Set identifier 145 identifies a set of files that hopefully includes the other file the user wants to insert into the document. Chooser 150 lets the user select one of the identified set of files as the other file, and inserter 155 inserts the chosen file into the document.

Although FIG. 1 suggests that receiver 140, set identifier 145, chooser 150, and inserter 155 are separate from application 130, a person of ordinary skill in the art will recognize that these components can be integrated. That is, application 130 can include some or all of these components. For example, receiver 140 can be integrated into application 130, so that the user can request to insert the file from within application 130. Receiver 140 can then pass the request to the other components to be processed.

Receiver 140 can receive the request from the user to insert the other file in many different ways. For example, application 130 can include a menu-accessible command that starts the process of inserting the other file. Or, receiver 140 can scan the text the user is inputting to application 130, and recognize an in-line request to insert a file. FIG. 2 shows an example of an in-line request.

In FIG. 2, text document 135 is shown. The user has been typing the text of the document. After reviewing the text, the user has positioned cursor 205 in the middle of the text, and inserted text 210 (represented by the dashed line). Text 210 is a request to insert an image into the document, specifically, an image of the U.S. Capitol building.

After processing request 210, text document 135 is modified to remove text 210 and to replace it with image 215. Although FIG. 2 shows the image as taking up entirety of the column to represent image 215 (that is, there is no text wrapping around the image, either on its right or left side), a person of ordinary skill in the art will recognize that image 215 could be inserted in any layout. Request 210 could also specify specific formatting and/or layout of image 215. For example, request 210 could specify "Insert image of U.S. Capitol building right justified, scaled to 2" wide". Parsing request 210 can identify such formatting/layout information.

As shown in FIG. 2, after request 210 is processed, metadata 220 is stored with image 215. Metadata 220 is shown as including the text of request 210. The text of request 210 is also known as the context of the request. By storing context 210 as metadata 220, embodiments of the invention permit users to revisit their searches and make modifications. If context 210 is refined, metadata 220 can store all the various forms taken by context 210, including the initial form and all later revisions. In this manner, embodiments of the invention permit a user to return to an earlier context, if a later refined context is not considered useful.

When image 215 is inserted in text document 135, image 215 can be inserted either as a static image or an embedded image (also called a dynamic image). A static image is just that: static. That is, image 215 reflects the state of the source file at the time image 215 was inserted into text document 135. If the source file of image 215 later changes, image 215 as inserted into text document 135 does not update to reflect this change. Using static images can be helpful as the user does not need to worry that the source file might change to a file that no longer satisfies the context.

On the other hand, image 215 can be an embedded image. An embedded image changes over time to reflect the current state of the source file. Thus, for example, if image 215 is modified to include color, image 215 as inserted in text document 135 can reflect the addition of color. Using embedded images can be helpful as the user does not need to worry about making sure updates to the source file are reflected wherever the source file is embedded.

Whether a media file is inserted as a static or embedded file can be specified in the context, or can be set as an option within the application. A person of ordinary skill in the art will recognize other ways in which the user can control whether a media file is inserted as a static or embedded file.

Although facially a "request" or a "context" might seem to be a query using a new name, a person of ordinary skill in the art will recognize that a "context" is broader than a query. For example, as discussed above, context 210 can include information about how to format the inserted file. The selection of a data set member that satisfies a "query" does not depend on what will be done with the selected member (e.g., formatting) after it is located. Thus, context 210 is a broader concept than an ordinary query.

One question that might occur to a reader is what happens if the user intended to include context 210 as actual text within document 135: that is, the user did not want to perform an in-line insertion? In one embodiment of the invention, whether in-line insertion occurs can be turned on and off as an option within the application. In another embodiment of the invention, the user can "undo" an in-line insertion, reverting to the "text" of context 210, by performing an undo command.

FIG. 3 shows sets of files from which a user can select to insert a file in the machine of FIG. 1. In FIG. 3, 12 files are shown (although only images of two of the files are actually shown); a person of ordinary skill in the art will recognize that there can be any number of files, and not just 12. The 12 files shown in FIG. 3 are organized into three sets: set 305, set 310, and image 315 (which forms a set unto itself).

Based on the context of the request to insert the file, embodiments of the invention can select a particular group of images from which to permit the user to select an image. For example, the context from the text document in FIG. 2 requested to insert an image of the U.S. Capitol building. Set 305 includes such an image, and could be selected as the set from which the user can select the desired image.

One question that might arise from the description provided is how the files in FIG. 3 are organized into sets 305 and 310, and image 315. There are several technologies available today that can provide information about the relationships among various members. For example, U.S. patent application Ser. No. 12/568,190, filed Sep. 28, 2009, titled "OPTIMAL SEQUENTIAL (DE)COMPRESSION OF DIGITAL DATA", U.S. patent application Ser. No. 12/575,652, filed Oct. 8, 2009, titled "ENCRYPTION/DECRYPTION OF DIGITAL DATA USING RELATED, BUT INDEPENDENT KEYS", U.S. patent application Ser. No. 12/616,306, filed Nov. 11, 2009, titled "DIGITAL SPECTRUM OF FILE BASED ON CONTENTS", U.S. patent application Ser. No. 12/637,807, filed Dec. 15, 2009, titled "GROUPING AND DIFFERENTIATING FILES BASED ON CONTENT", U.S. patent application Ser. No. 12/648,542, filed Dec. 29, 2009, titled "GROUPING AND DIFFERENTIATING FILES BASED ON UNDERLYING GROUPED AND DIFFERENTIATED FILES", U.S. patent application Ser. No. 12/649,584, filed Dec. 30, 2009, titled "OPTIMIZED PARTITIONS FOR GROUPING AND DIFFERENTIATING FILES OF DATA", U.S. patent application Ser. No. 12/649,688, filed Dec. 30, 2009, titled "STOPPING FUNCTIONS FOR GROUPING AND DIFFERENTIATING FILES BASED ON CONTENT", U.S. patent application Ser. No. 12/684,313, filed Jan. 8, 2010, titled "GROUPING AND DIFFERENTIATING VOLUMES OF FILES", U.S. patent application Ser. No. 12/759,414, filed Apr. 13, 2010, titled "RELEVANCY FILTER FOR NEW DATA BASED ON UNDERLYING FILES", U.S. patent application Ser. No. 12/720,897, filed Mar. 10, 2010, titled "HARVESTING RELEVANCY DATA, INCLUDING DYNAMIC RELEVANCY AGENT BASED ON UNDERLYING GROUPED AND DIFFERENTIATED FILES", U.S. patent application Ser. No. 12/985,899, filed Jan. 6, 2011, titled "SEMANTIC ASSOCIATIONS IN DATA", U.S. patent application Ser. No. 13/019,577, filed Feb. 2, 2011, titled "ANIMATING INANIMATE DATA", U.S. patent application Ser. No. 13/033,490, filed Feb. 23, 2011, titled "STRUCTURED RELEVANCE—A MECHANISM TO REVEAL "HOW" DATA IS RELATED", U.S. patent application Ser. No. 13/033,509, filed Feb. 23, 2011, titled "STRUCTURED RELEVANCE—A MECHANISM TO REVEAL "WHY" DATA IS RELATED", U.S. patent application Ser. No. 13/051,376, filed Mar. 18, 2011, titled "GENERATING AND MERGING KEYS FOR GROUPING AND DIFFERENTIATING VOLUMES OF FILES", U.S. patent application Ser. No. 13/070,026, filed Mar. 23, 2011, titled "POSITIONING RELATIONSHIPS BETWEEN GROUPS OF FILES", U.S. patent application Ser. No. 13/103,400, filed May 9, 2011, titled "A METHOD FOR FINDING OPTIMIZED RELEVANCY GROUP", all of which are incorporated by reference herein, are patent applications that describe ways of determining relationships among members of a data set. But a person skilled in the art will recognize that there are other ways in which to determine relationships between members of a data set.

The grouping of the members of the overall data set into the various sets shown in FIG. 3, and determining the associated tags for the members of the sets, can be done in advance of the use of embodiments of this invention. Thus, by the time the user queries for an image of the U.S. Capitol building, set 305 can already have been tagged as storing files relating to the U.S. Capitol building.

Other technologies are also useful in determining which files belong in various sets. For example, U.S. patent application Ser. No. 12/985,899, filed Jan. 6, 2011, titled "SEMANTIC ASSOCIATIONS IN DATA", which is incorporated by reference herein, helps to correlate information between files. For example, the images in set 305 are all tagged as being related to the U.S. Capitol. If one of these images is later tagged as relating to the U.S. government, U.S. patent application Ser. No. 12/985,899, filed Jan. 6, 2011, titled "SEMANTIC ASSOCIATIONS IN DATA", associates the "U.S. government" tag with the other images in set 305. U.S. patent application Ser. No. 12/985,899, filed Jan. 6, 2011, titled "SEMANTIC ASSOCIATIONS IN DATA", can also be used to bridge files of different types. For example, if all the files in set 305 are image files, and later an audio file (e.g., a sound clip) is tagged as relating to the U.S. Capitol building, U.S. patent application Ser. No. 12/985,899, filed Jan. 6, 2011, titled "SEMANTIC ASSOCIATIONS IN DATA", can be used to add the newly tagged audio file to set 305.

Another technology that can be used to merge groups of files is U.S. patent application Ser. No. 13/033,509, filed Feb. 23, 2011, titled "STRUCTURED RELEVANCE—A MECHANISM TO REVEAL WHY DATA IS RELATED", which is incorporated by reference herein, describes how to join two groups in a graph. If it is determined that two different groups (separated, perhaps, because they include files of different types) are related, U.S. patent application Ser. No. 13/033,509, filed Feb. 23, 2011, titled "STRUCTURED RELEVANCE—A MECHANISM TO REVEAL WHY DATA IS RELATED", can be used to merge the two groups, so that all the files can be presented to the user at the same time.

When the user selects a particular file (such as image 215) from set 305, the selection of the specific image actually refines the context. Now, instead of being interested in an image of the U.S. Capitol building, the user is interested in an image of the U.S. Capitol building, as represented by the source file for image 215. Although this might not necessarily be useful if the source file for image 215 is already part of set 305, what if the user ends up selecting a file not in set 305? U.S. patent application Ser. No. 12/759,414, filed Apr. 13, 2010 titled "RELEVANCY FILTER FOR NEW DATA BASED ON UNDERLYING FILES", which is incorporated by reference herein, can take a grouping of files (such as sets 305 and 310 and image 315) and an unprocessed file, and determine what group that file belongs to. So, if the context requested an image of the U.S. Capitol building, but the user ultimately selects a file not in set 305, U.S. patent application Ser. No. 12/759,414, filed Apr. 13, 2010 titled "RELEVANCY FILTER FOR NEW DATA BASED ON UNDERLYING FILES", can determine what set the unprocessed file belongs in. Performing this processing not only adds the unprocessed file to a particular group, but it can also update the tags on the group: as discussed above with reference to U.S. patent application Ser. No. 12/985,899, filed Jan. 6, 2011, titled "SEMANTIC ASSOCIATIONS IN DATA", linking the new file to a group also updates any other metadata relating to the files in the group and the new file.

FIG. 3 shows set of files. When a set is identified as possibly including the desired file to satisfy the context, the files in the set can be presented to the user in any desired manner. The files can be presented linearly: the files are presented to the user in a line, which the user can scroll left/right to find a particular file. The files can be presented hierarchically: when the user clicks on a particular file, it does not necessarily select that file, but can change the display to center on that file (and to organize the remaining files in the set based on their relative "distance" from that file). The files can be presented dynamically, where the particular presentation to be used can be based on prior searches. A person of ordinary skill in the art will recognize other ways in which the files can be presented to the user.

Figure 4:
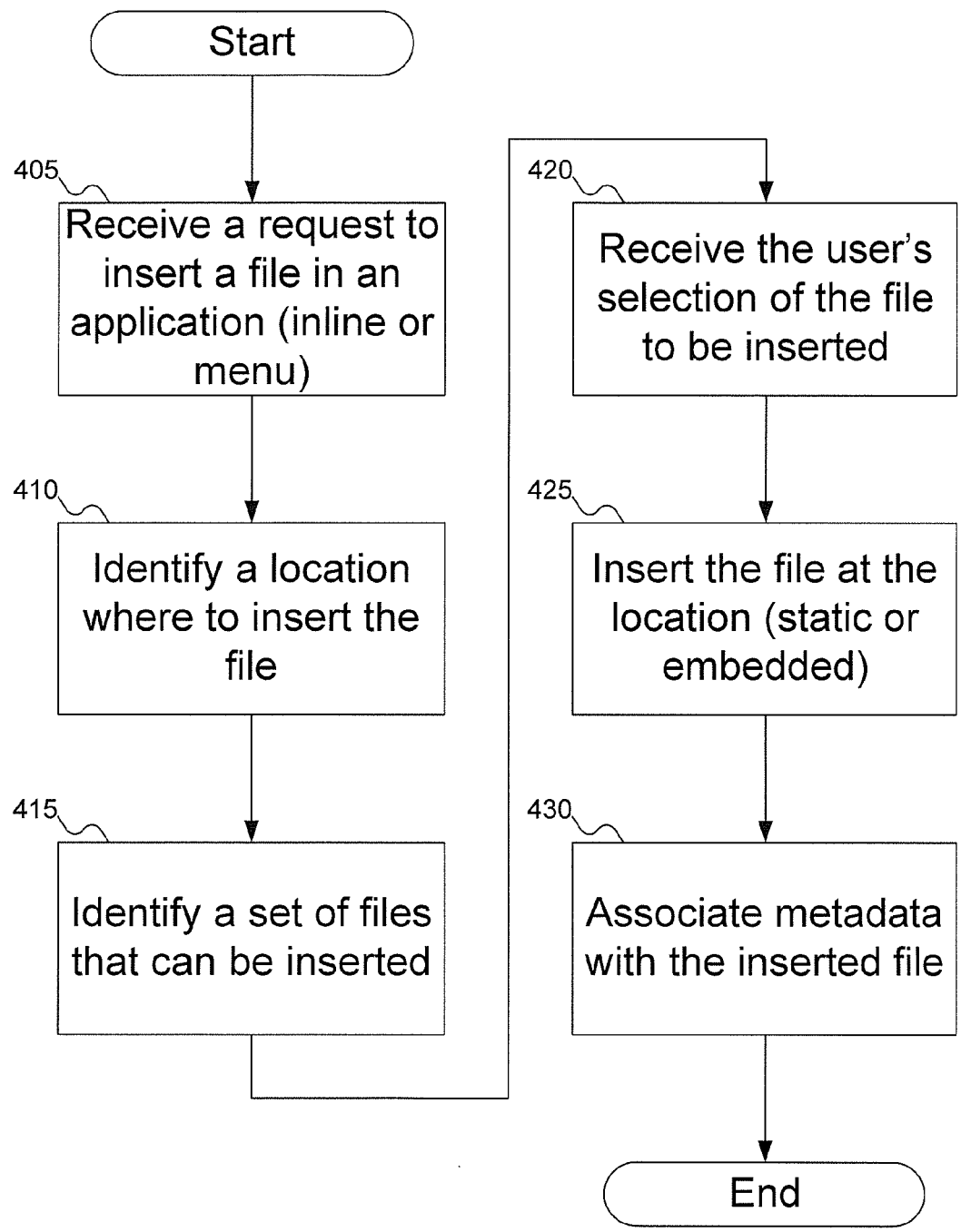
FIG. 4 shows a flowchart of a procedure to perform integrated media browse and insertion, according to an embodiment of the invention.

FIG. 4 shows a flowchart of a procedure to perform integrated media browse and insertion, according to an embodiment of the invention. In FIG. 4, at block 405, the system receives a request to insert a file. As discussed above, this request includes a context for the file to be inserted. At block 410, the system identifies a location where the file is to be inserted. At block 415, the system identifies a set of files from which the (hopefully) desired file can be found. At block 420, the system receives the user's selection of the file to be inserted. At block 425, the system inserts the selected file at the location. The inserted file can be either static or dynamic. At block 430, the system associates metadata with the inserted file. The metadata can include the context of the request.

Searches can be divided into 4 cases: (1) known and expected (the user is looking for a known item); (2) unknown but expected (the user is looking for an item that is likely to exist) (3) unknown but possible (the user is looking for an item that might exist); and (4) unknown and unexpected (the user does not really know what he is looking for). Embodiments of the invention make it possible, or at least easier, for users to perform file searches. In particular, embodiments of the invention make it easier to locate desired items in cases (2) and (3), make it easier to locate desired items in case (1), and make it possible to locate items in case (4).

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium (non-transitory media), storage devices, a video interface, and input/output interface ports. The machine can be controlled, at least in part, by input from conventional input devices, such as keyboards, mice, touch screens, etc., as well as by directives received from another machine, interaction with a virtual reality (VR) environment, biometric feedback. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, non-transitory physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. An apparatus, comprising:
   a computer;
   an application adapted to execute on the computer, the application for editing a first file;
   a receiver within the application to receive a request as inline text to insert a second file into said first file, said request including a context for said second file, said context including content for said second file, and said request is made by the user at a location in said first file identified by a cursor position where the user has placed a cursor within the first file and provided the inline text, the context defining formatting instructions for inserting the second file into the first file, the formatting instructions parsed from the request and includes scaling and justification to apply to the second file when inserted into the first file, and the second file that is inserted into the first file is a static file or a dynamic file, when second file is the static file, the second file remains unchanged within the first file and when the second file is the dynamic file, the second file is updated within the first file when the second file is changed, and storing the context and any later refinements to the context as metadata, permitting the context and the later context to be recalled when requested;
   a set identifier to identify a set of files that satisfy said context for said second file;
   a chooser with the application to permit the user to choose said second file from said set of files without leaving the application;
   an inserter to insert the desired content defined in the context content from said second file into said first file at said location in said first file and to remove the inline text from the first file at said location; and
   an undo command to permit the user to issue the undo command to revert to text of the context.

2. The apparatus of claim 1, wherein:
   the application includes a text editor; and
   said first file includes a text document.

3. The apparatus of claim 2, wherein the receiver is operative to receive said request in-line with text of said text document.

4. The apparatus of claim 2, wherein the receiver is operative to receive said request from a menu of the text editing application.

5. The apparatus of claim 2, wherein the inserter includes a metadata associator to associate the metadata including said context for said second file with said second file inserted into said text document at said location in said text document.

6. The apparatus of claim 2, wherein:
   the receiver within the text editing application is operative to receive a second request to insert a third file into said text document, said request including a refined context for said third file;
   the set identifier is operative to identify a second set of files that satisfy said refined context for said third file;
   the chooser with the text editing application is operative to permit said user to choose said third file from said second set of files without leaving the text editing application;
   the inserter is operative to insert said third file into said text document at said location in said text document.

7. The apparatus of claim 6, wherein the inserter includes a metadata associator to associate the metadata including said refined context for said third file with said third file inserted into said text document at said location in said text document.

8. The apparatus of claim 2, wherein said second file is inserted into said text document at said location in said text document as an embedded object.

9. A method, comprising:
   receiving, by an application executing on a computer, a request for editing a first file as inline text within the first file, the request associated with inserting a second file into the first file, the request also including a context for the second file, the context identifying a content for the second file, the context defining formatting instructions for inserting the content into the first file, and the second file is a static file or a dynamic file, when the first file is the static file, the first file statically remains unchanged within the first file and when the second file is the dynamic file, the second file is updated within the first file when the second file changes, and storing the context and any later refinements to the context as metadata, permitting the context and the later context to be recalled when requested;
   identifying a location in the first file where the second file is to be inserted;
   identifying a set of files that satisfy the context for the second file;
   permitting a user to select the second file from the set of files without leaving the application for editing the first file;
   inserting the content defined in the context from the second file into the first file at the location in the first file and removing the inline text from the first file; and
   undoing the inserted content when an undo command is identified by reverting to text of the context.

10. A method according to claim 9, wherein:
- receiving the request to insert the second file into the first file includes, within a text editing application running on the computer for editing a text document receiving the request to insert the second file into the text document, the request including the context for the second file;
- identifying the location in the first file where the second file is to be inserted includes identifying the location in the text document where the second file is to be inserted;
- permitting the user to select the second file from the set of files includes permitting the user to select the second file from the set of files without leaving the text editing application for editing the text document; and
- inserting the second file into the first file includes inserting the second file into the text document at the location in the text document.

11. The method of claim 10, wherein receiving the request to insert the second file into the text document includes receiving the request to insert the second file into the text document; the request including the context for the second file, the request coming in-line with text of the text document from within the text editing application for editing the text document.

12. The method of claim 10, wherein receiving the request to insert the second file into the text document includes receiving the request to insert the second file into the text document, the request including the context for the second file, the request coming via a menu of the text editing application for editing the text document.

13. The method of claim 10, wherein inserting the second file into the text document includes associating the metadata including the context for the second file with the second file inserted into the text document at the location in the text document.

14. The method of claim 10, further comprising:
- receiving a second request to insert a third file into the text document in place of the second file, the request including a refined context for the third file;
- identifying a second set of files that satisfy the refined context for the third file;
- permitting the user to select the third file from the second set of files without leaving the text editing application for editing the text document; and
- replacing the second file with the third file at the location in the text document.

15. The method of claim 14, wherein replacing the second file with the third file includes associating the metadata including the refined context for the third file with the third file inserted into the text document at the location in the text document, the refined context including the metadata associated with the second file inserted at the location in the text document.

16. The method of claim 10, wherein inserting the second file into the text document at the location in the text document includes inserting the second file into the text document at the location as an embedded object.

17. A non-transitory computer storage medium having executable instructions that when executed by a computer performs a method comprising:
- receiving, by an application executing on the computer, a request for editing a first file, the request associated with inserting a second file into the first file and the request including a context for the second file, a context received as inline text within the first file and the context identifying a content for the second file, the context defining formatting instructions for inserting the content into the first file, and the second file is a static file or a dynamic file, when the second file is the static file, the second file remains unchanged within the first file and when the second file is the dynamic file, the second file is updated within the first file when the second file changes, and storing the context and any later refinements to the context as metadata, permitting the context and the later context to be recalled when requested;
- identifying a location in the first file where the second file is to be inserted;
- identifying a set of files that satisfy the context for the second file;
- permitting a user to select the second file from the set of files without leaving the application for editing the first file;
- inserting the content defined in the context for the second file into the first file at the location in the first file and removing the inline text from the first file; and
- undoing the content inserted into the first file when an undo command is identified by reverting to text of the context.

18. The non-transitory computer-readable storage medium of claim 17, wherein:
- receiving the request to insert the second file into the first file includes, within a text editing application executing on the computer for editing a text document, receiving the request to insert the second file into the text document, the request including the context for the second file;
- identifying the location in the first file where the second file is to be inserted includes identifying the location in the text document where the second file is to be inserted;
- permitting the user to select the second file from the set of files includes permitting the user to select the second file from the set of files without leaving the text editing application for editing the text document; and
- inserting the second file into the first file includes inserting the second file into the text document at the location in the text document.

19. The non-transitory computer-readable storage medium of claim 18, wherein receiving the request to insert the second file into the text document includes receiving the request to insert the second file into the text document, the request including the context the second, the request coming in-line with text of the text document from within the text editing application for editing the text document.

20. The non-transitory computer-readable storage medium of claim 18, wherein receiving the request to insert the second file into the text document includes receiving the request to insert the second file into the text document, the request including the context for the second file, the request coming via a menu of the text editing application for editing the text document.

21. The non-transitory computer-readable storage medium of claim 18, wherein inserting the second file into the text document includes associating the metadata including the context for the second file with the second file inserted into the text document at the location in the text document.

22. The non-transitory computer-readable storage medium of claim 18, further comprising instructions for:
- receiving a second request to insert a third file into the text document in place of the second file, the request including a refined context for the third file;

identifying a second set of files that satisfy the refined context for the third file;
permitting the user to select the third file from the second set of files without leaving the text editing application for editing the text document; and
replacing the second file with the third file at the location in the text document.

23. The non-transitory computer-readable storage medium of claim 22, wherein replacing the second file with the third file includes associating the metadata including the refined context for the third file with the third file inserted into the text document at the location in the text document, the refined context including the metadata associated with the second file inserted at the location in the text document.

24. The non-transitory computer-readable storage medium of claim 18, wherein inserting the second file into the text document at the location in the text document includes inserting the second file into the text document at the location as an embedded object.

* * * * *